United States Patent [19]

Nishina

[11] Patent Number: 4,836,664

[45] Date of Patent: Jun. 6, 1989

[54] LENS SYSTEM FOR A COPIER

[75] Inventor: Kiichiro Nishina, Tokyo, Japan

[73] Assignee: Ricoh Company, Ltd., Tokyo, Japan

[21] Appl. No.: 150,295

[22] Filed: Jan. 29, 1988

[30] Foreign Application Priority Data

Jan. 29, 1987 [JP] Japan .................................. 62-17220

[51] Int. Cl.$^4$ ................................................. G02B 9/62
[52] U.S. Cl. ..................................... 350/464; 350/450
[58] Field of Search ................................ 350/464, 450

[56] References Cited

U.S. PATENT DOCUMENTS 2,671,380  3/1954  Baker .................................. 350/464

Primary Examiner—Bruce Y. Arnold
Assistant Examiner—Rebecca D. Gass
Attorney, Agent, or Firm—Oblon, Spivak, McClelland, Maier & Neustadt

[57] ABSTRACT

A lens system suitable for use in a full color copier has a 6-unit 8-element basic structure which is completely symmetrical with its stop as its center of symmetry. The lens system includes along its optical axis in the order mentioned from its object side: a first unit including a first lens; a second unit including a second lens; a third unit including third and fourth lenses; a stop; a fourth unit including fifth and sixth lenses identical to the fourth and third lenses, respectively; a fifth unit including a seventh lens identical to the second lens; and a sixth unit including an eighth lens identical to the first lens. The lens system also satisfies the following conditions.

$$0.05 < |f_{3.4}/f_{1.2}| < 0.27; \tag{1}$$

$$10 < \nu_4 - \nu_3 < 30; \text{ and} \tag{2}$$

$$n_1 > 1.67. \tag{3}$$

3 Claims, 14 Drawing Sheets

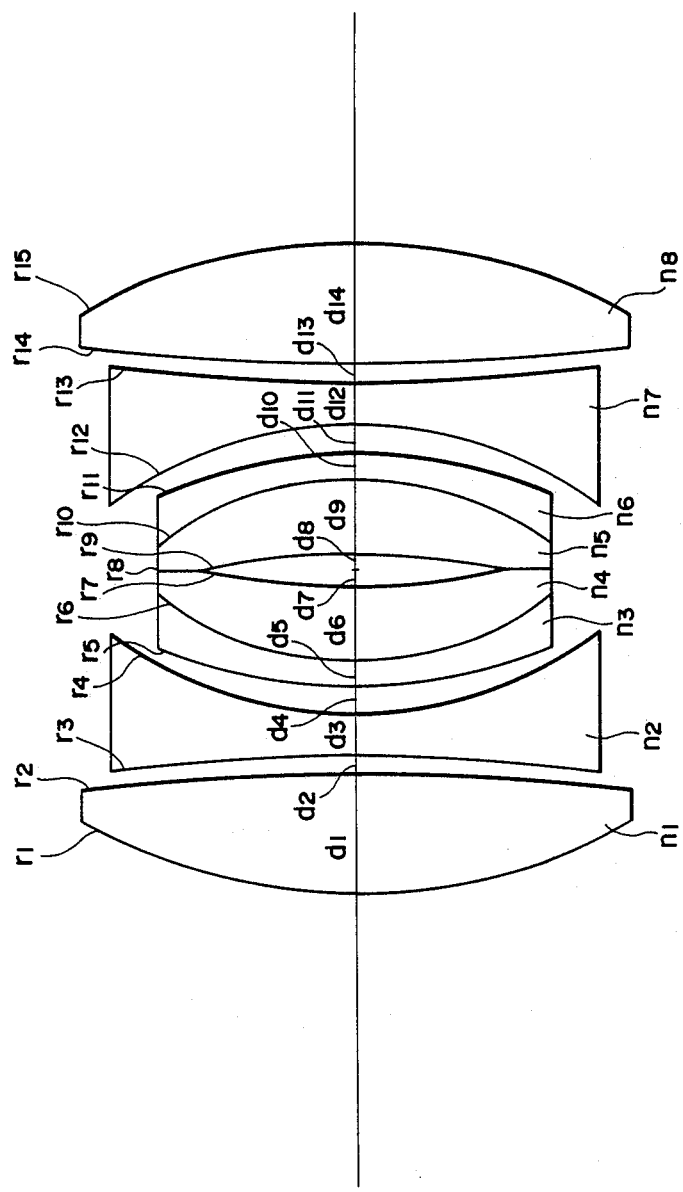

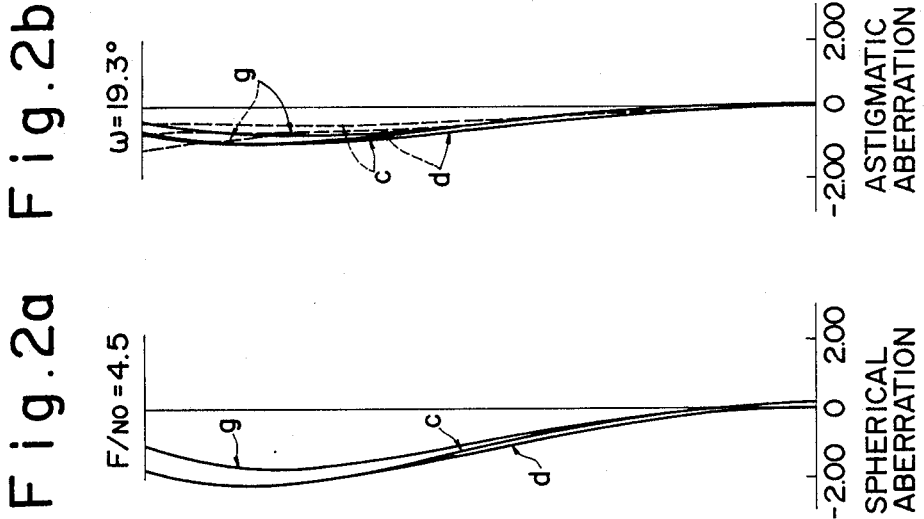
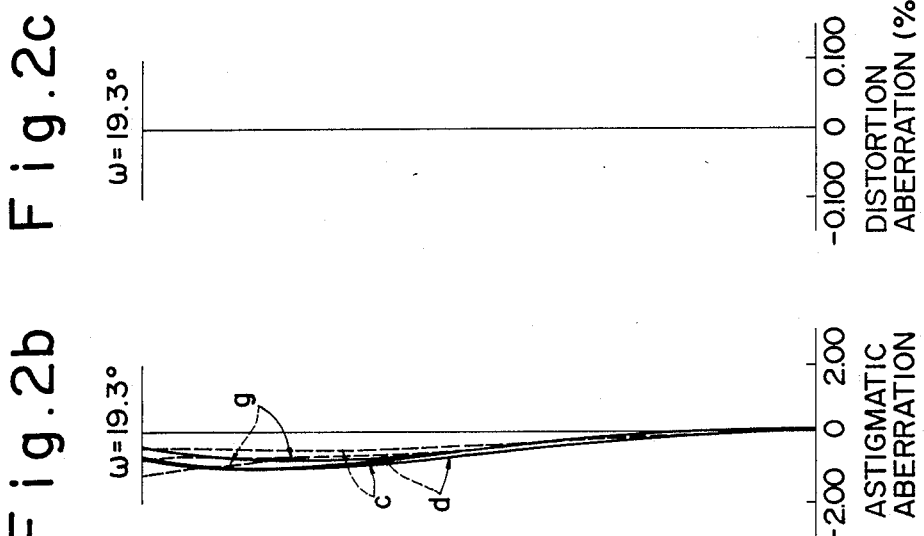
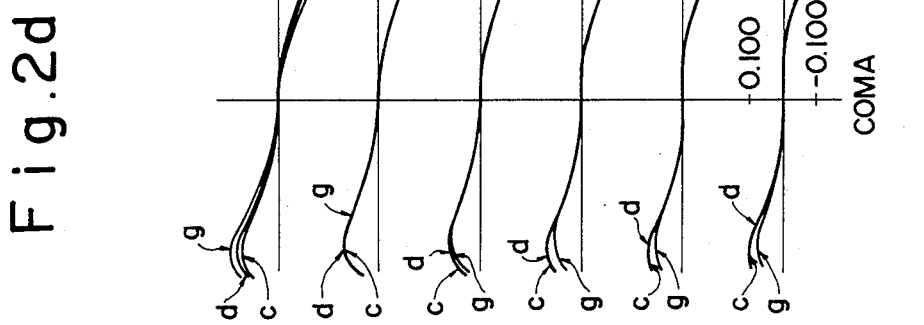

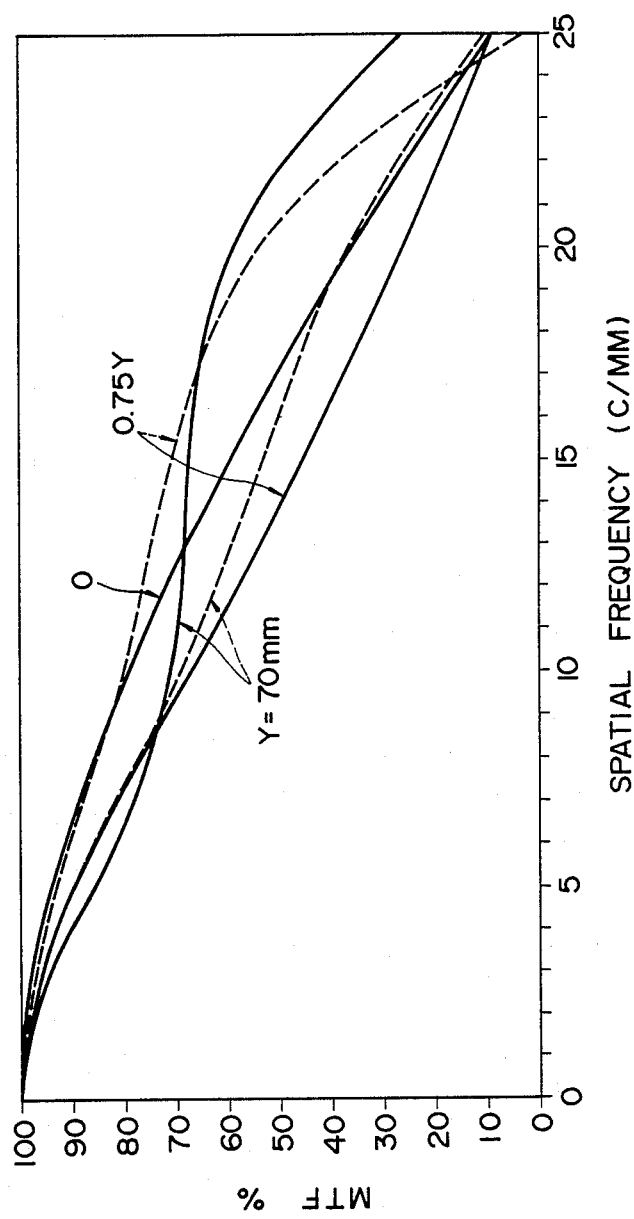

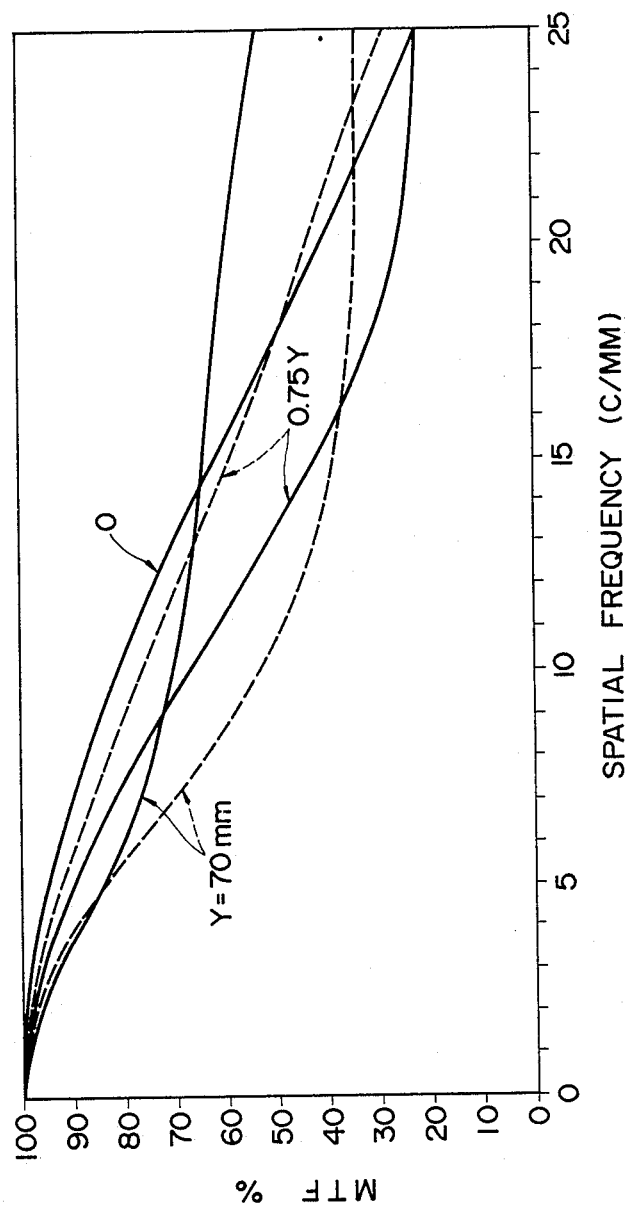

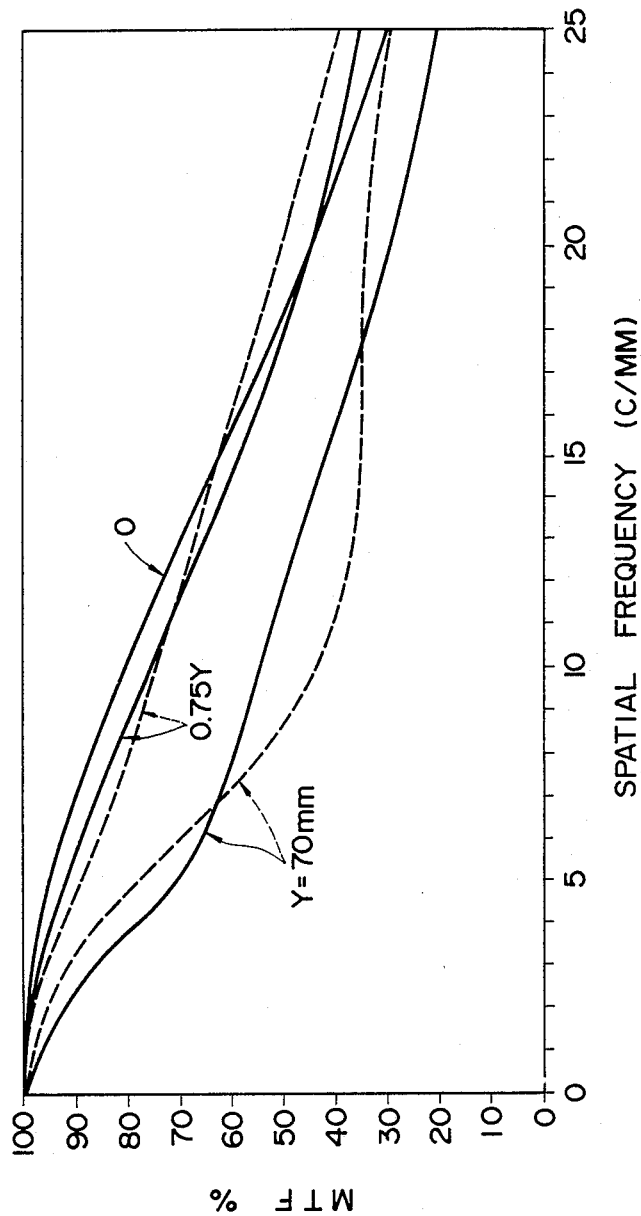

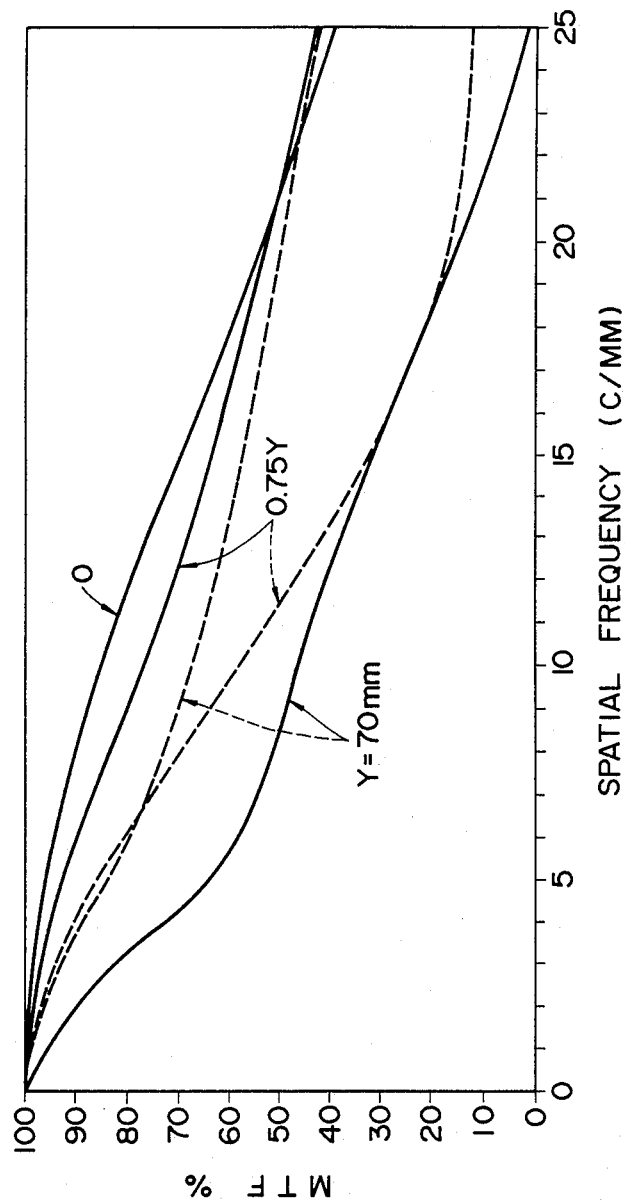

LENS SYSTEM FOR A COPIER

BACKGROUND OF THE INVENTION

1. Field of the Invention

This invention generally relates to a multi-lens system, and, in particular, to a lens system suitable for use in a copier. More specifically, the present invention relates to a full color copier lens system having an excellent correction in color aberration.

2. Description of the Prior Art

Recently, a demand for copiers has been rapidly increasing. In particular, over the last few years, a demand for full color copiers has increased. For this reason, there has arisen a demand for a new lens system suitable for use in a full color copier. As far as lens system is concerned, one of the largest differences between a lens system of a full color copier and a lens system of a monochromatic copier resides in that, in a full color copier, white light is decomposed into, for example, three color components, such as R, G and B, and these color component images must be focused on an imaging plane, such as the surface of a photosensitive member, on a one-to-one basis. For this reason, in the case of a full color lens system, it is required to minimize the longitudinal chromatic aberration as much as possible as compared with a monochromatic lens system. In a typical prior art monochromatic lens system for use in a copier, with a unity magnification arrangement, there is a longitudinal color aberration in the order of 0.01f (here, f: combined focal distance of a lens system). If such a lens system were used in a full color copier, the location of an image forming plane would differ among the color components of R, G and B by the amount corresponding to the longitudinal color aberration, so that there would cause a magnification error and a deterioration in image forming performance.

Japanese Pat. Laid-open Pub. No. 49-42335 discloses a lens system having a 6-unit-8-element structure. However, the lens system of this publication has the longitudinal color aberration for c and g lines of 0.01f or more and the F number of 10, which is rather dark. In addition, there are other disadvantages, such as large coma flare, excessive overall aberration and poor contrast.

SUMMARY OF THE INVENTION

It is therefore a primary object of the present invention to obviate the disadvantages of the prior art and to provide an improved lens system for use in a full color copying apparatus.

Another object of the present invention is to provide an improved lens system whose longitudinal color aberration is minimized as much as possible over a wide range from g line to c line.

A further object of the present invention is to provide an improved lens system having a six unit and eight element (6-unit-eight-element) structure.

A still further object of the present invention is to provide an improved lens system suitable for use in a copier, least in aberration and allowing to obtain a high contrast image.

Other objects, advantages and novel features of the present invention will become apparent from the following detailed description of the invention when considered in conjunction with the accompanying drawings.

BRIEF DESCRIPTION OF THE DRAWINGS

FIG. 1 is a schematic illustration showing the overall structure of a lens system constructed in accordance with one embodiment of the present invention;

FIGS. 2a through 2d are graphs showing the aberration characteristics of one embodiment of the present lens system;

FIGS. 3 through 5 are graphs showing MTF curves for R, G and B, respectively, for the embodiment shown in FIGS. 2a through 2d;

FIGS. 7 through 9 are graphs showing MTF curves for R, G and B, respectively, for the embodiment shown in FIGS. 6a through 6d;

DESCRIPTION OF THE PREFERRED EMBODIMENTS

Figures 6A, 6B, 6C, 6D:
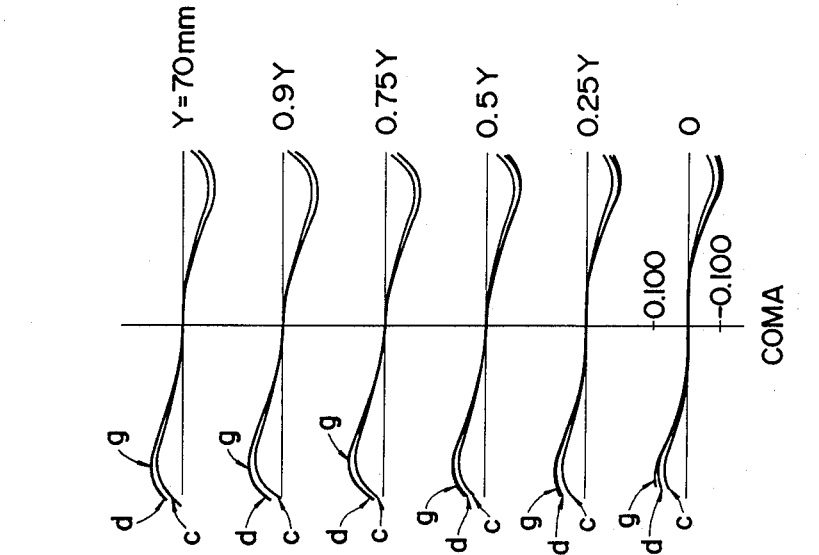
FIGS. 6a through 6d are graphs showing the aberration characteristics of another embodiment of the present lens system.

In accordance with the principle of the present invention, there is provided a lens system having a six unit and eight element structure, which comprises: in the order mentioned from an object side, a first unit including a first lens which is a double-convex lens; a second unit including a second lens which is a double-concave lens; a third unit including a third lens which is a concave meniscus lens arranged with its convex surface directed to the object side and a fourth lens which is a convex meniscus lens cemented to said third lens and arranged with its convex surface directed to the object side; a stop; a fourth unit including a fifth lens which is a convex meniscus lens identical to said fourth lens and arranged with its concave surface directed to the object side and a sixth lens which is a concave meniscus lens identical to said third lens and cemented to said fifth lens with its concave surface directed to the object side; a fifth unit including a seventh lens which is a double-concave lens identical to said second lens; and a sixth unit including an eighth lens which is a double-convex lens identical to said first lens.

The present lens system having the basic structure as described above has a completely symmetrical structure with the stop as a center and satisfies the following conditions:

$$0.05 < |f_{3,4}/f_{1,2}| < 0.27 \quad (1)$$

$$10 < \nu_4 - \nu_3 < 30 \quad (2)$$

$$n_1 > 1.67 \quad (3)$$

Here, $f_{1,2}$: Combined focal distance for the first (sixth) and second (fifth) units.
$f_{3,4}$: Combined focal distance for the third (fourth) unit.
$\nu_3$: Abbe number of the third (sixth) lens.
$\nu_4$: Abbe number of the fourth (fifth) lens.

$n_1$: Refractive index of the first (eighth) lens. In the above-described conditions, condition (1) is to define the ratio between the combined focal distance of the first (sixth) and second (fifth) units and the combined focal distance of the third (fourth) unit, and, thus, it determines the basic power arrangement of this lens system. If this upper limit is exceeded, the Petzval sum becomes excessively small, so that the image plane is shifted too much in the positive direction, whereby the curvature of the sagittal in the astigmatism aberration becomes too large. On the contrary, if the lower limit is exceeded, the Petzval sum becomes too large, so that the image plane is shifted too much in the negative direction, whereby the astigmatic difference becomes too large to thereby increase the coma flare and to deteriorate the image forming characteristic significantly. The condition (2) is to correct the color aberration. If the upper limit of this condition (2) is exceeded, the short wave length side (e.g., g line) becomes too large in a positive sense; on the other hand, if the lower limit is exceeded, the short wave length side (e.g., g line) becomes too large in a negative sense. The condition (3) is to determine the refractive index of the first (eighth) lens. Outside of this range, the Petzval sum becomes too large, and, in particular, the coma flare becomes too large, which can cause a deterioration in contrast.

Figure 14:
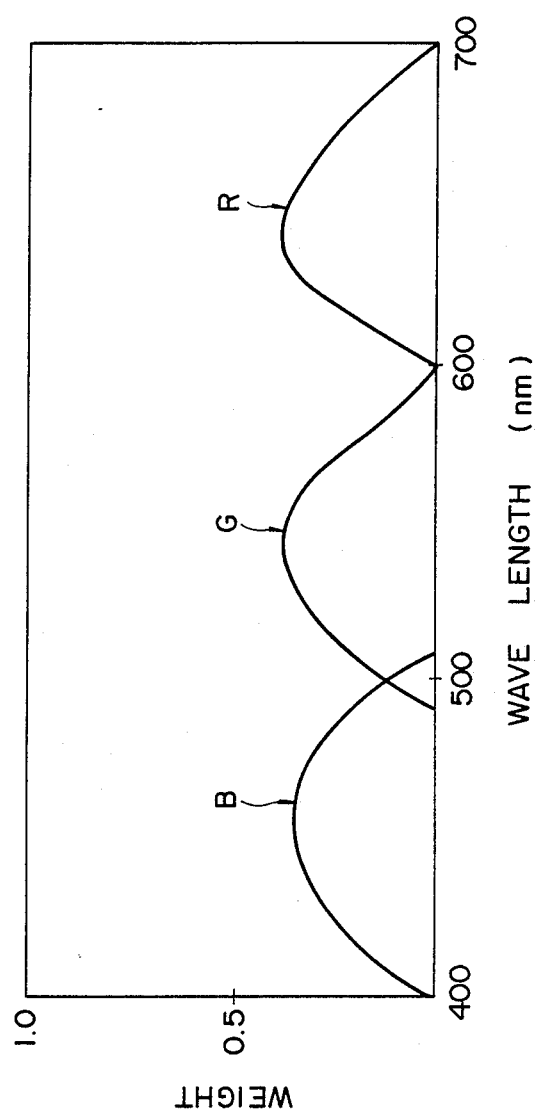
FIG. 14 is a graph showing one example of a weight for decomposition into three colors of R, G and B.

In what follows, there will be described a few examples of a lens system for a copier constructed in accordance with the principle of the present invention in the case where white light is to be decomposed into color components R, G and B using respective weights shown in FIG. 14. The following nomenclature will be employed:

$r_1, \ldots, r_{15}$: radius of curvature of each surface in the order from the object side.

$d_1, \ldots, d_{14}$: surface spacing of each surface in the order from the object side.

$n_1, \ldots, n_8$: refractive index of each lens in the order from the object side.

$\nu_1, \ldots, \nu_8$: Abbe number of each lens in the order from the object side.

$f_{1,2}$: combined focal distance of the first (sixth) and second (fifth) units.

$f_{3,4}$: combined focal distance of the third (fourth) unit.

f: combined focal distance of the total lens system.

F/No: F number.

$\omega$: half-field angle.

Y: object height m: magnification.

It is to be noted that, in the graphs of astigmatic aberration and the MTF curves, the solid lines indicate sagittal light rays and the dotted lines indicate meridional light rays.

EXAMPLE 1

$f=99.988$ $f_{1.2}=-1106.702$ $f_{3.4}=118.605$
F/No.$=4.5$ $\omega=19.3°$ Y$=70$ mm m$=1.0$
$r_1=32.351$ $d_1=6.486$ $n_1=1.74330$ $\nu_1=49.2$
$r_2=-141.159$ $d_2=1.070$
$r_3=-97.925$ $d_3=2.178$ $n_2=1.61340$ $\nu_2=44.3$
$r_4=22.645$ $d_4=1.532$
$r_5=27.352$ $d_5=1.395$ $n_3=1.51009$ $\nu_3=63.4$
$r_6=17.843$ $d_6=4.214$ $n_4=1.49700$ $\nu_4=81.6$
$r_7=48.791$ $d_7=0.835$
$r_8=\infty$(stop) $d_8=0.835$
$r_9=-48.791$ $d_9=4.214$ $n_5=1.49700$ $\nu_5=81.6$
$r_{10}=-17.843$ $d_{10}=1.395$ $n_6=1.51009$ $\nu_6=63.4$
$r_{11}=-27.352$ $d_{11}=1.532$
$r_{12}=-22.645$ $d_{12}=2.178$ $n_7=1.61340$ $\nu_7=44.3$
$r_{13}-97.925$ $d_{13}=1.070$
$r_{14}=141.159$ $d_{14}=6.486$ $n_8=1.74330$ $\nu_8=49.2$
$r_{15}=-32.351$ Under the circumstances, the value of each of the before-mentioned conditions is as follows:

$|f_{3.4}/f_{1.2}|=0.107$ (1)

$\nu_4-\nu_3=18.2$ (2)

$n_1=1.74330$ (3)

For this example 1, the aberration characteristics are shown in FIGS. 2a through 2d and the MTF characteristics for R, G and B are shown in FIGS. 3 through 5, respectively.

EXAMPLE 2

$f=100.003$ $f_{1.2}=-961.056$ $f_{3.4}=112.476$
F/No.$=4.5$ $\omega=19.3°$ Y$=70$ mm m$=1.0$
$r_1=32.890$ $d_1=6.963$ $n_1=1.77250$ $\nu_1=49.6$
$r_2=-156.615$ $d_2=0.047$
$r_3=-147.066$ $d_3=4.570$ $n_2=1.61340$ $\nu_2=44.3$
$r_4=20.376$ $d_4=1.233$
$r_5=23.215$ $d_5=1.398$ $n_3=1.58900$ $\nu_3=48.5$
$r_6=18.833$ $d_6=2.953$ $n_4=1.48749$ $\nu_4=70.4$
$r_7=40.777$ $d_7=0.985$
$r_8=\infty$(stop) $d_8=0.985$
$r_9=-40.777$ $d_9=2.953$ $n_5=1.48749$ $\nu_5=70.4$
$r_{10}=-18.833$ $d_{10}=1.398$ $n_6=1.58900$ $\nu_6=48.5$
$r_{11}=-23.215$ $d_{11}=1.233$
$r_{12}=-20.376$ $d_{12}=4.570$ $n_7=1.61340$ $\nu_7=44.3$
$r_{13}-147.066$ $d_{13}=0.047$
$r_{14}=156.615$ $d_{14}=6.963$ $n_8=1.77250$ $\nu_8=49.6$
$r_{15}=-32.890$ $|f_{3.4}/f_{1.2}|=0.117$ (1)

$\nu_4-\nu_3=21.9$ (2)

$n_1=1.77250$ (3)

Figure 8:
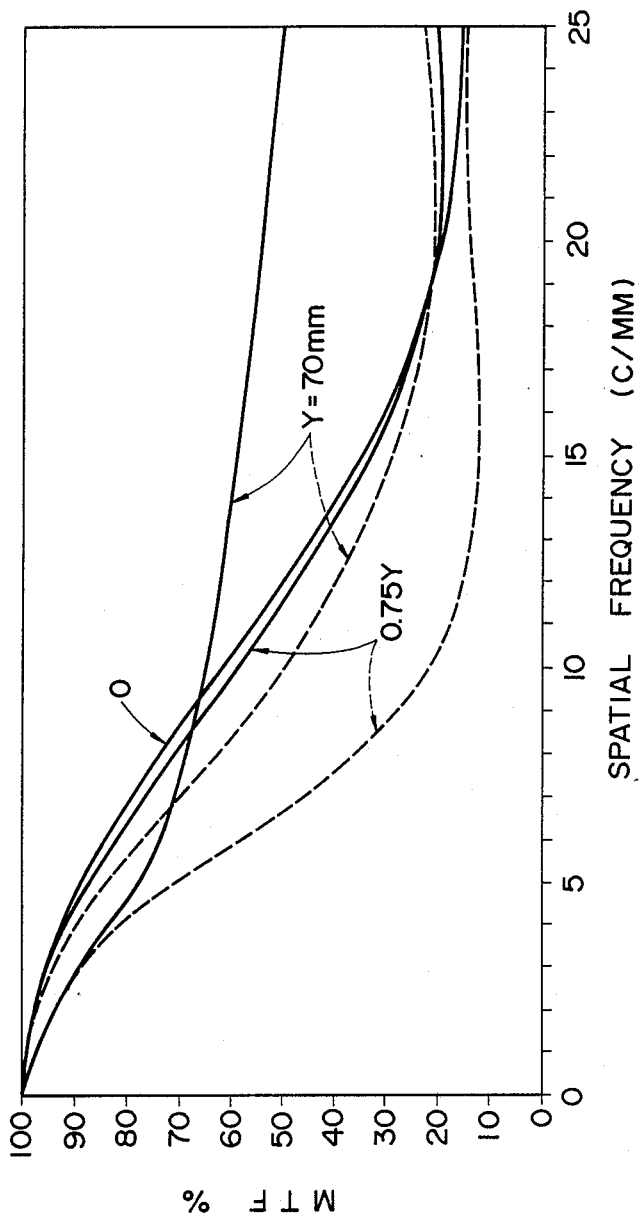
Figure 9:
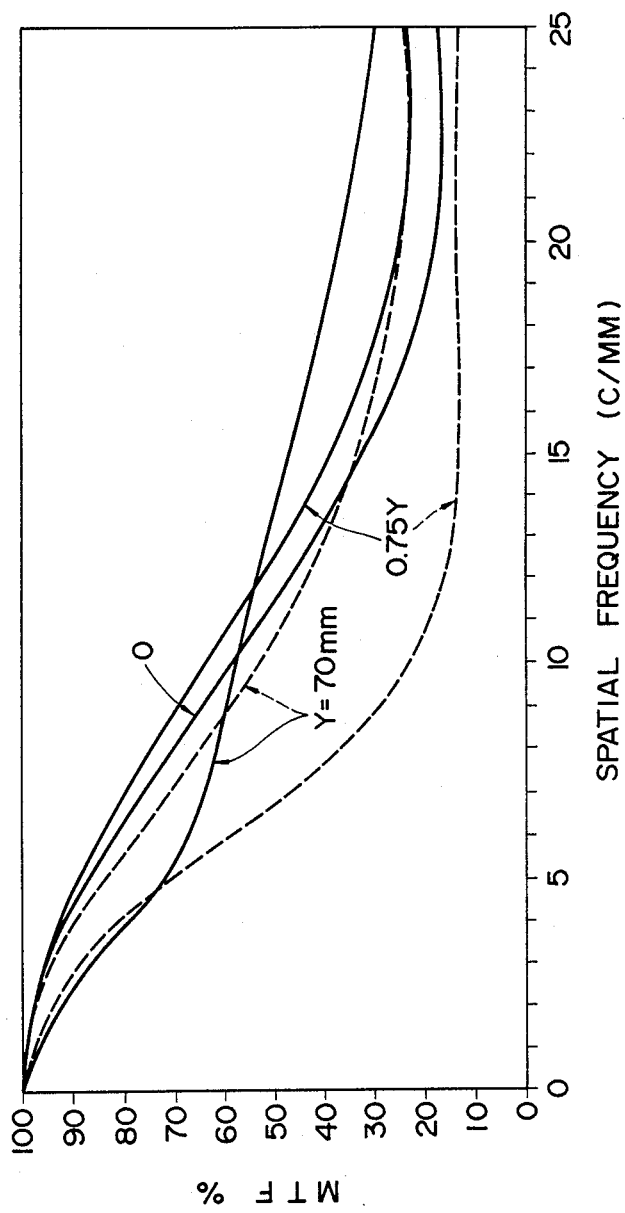
Figure 10D:
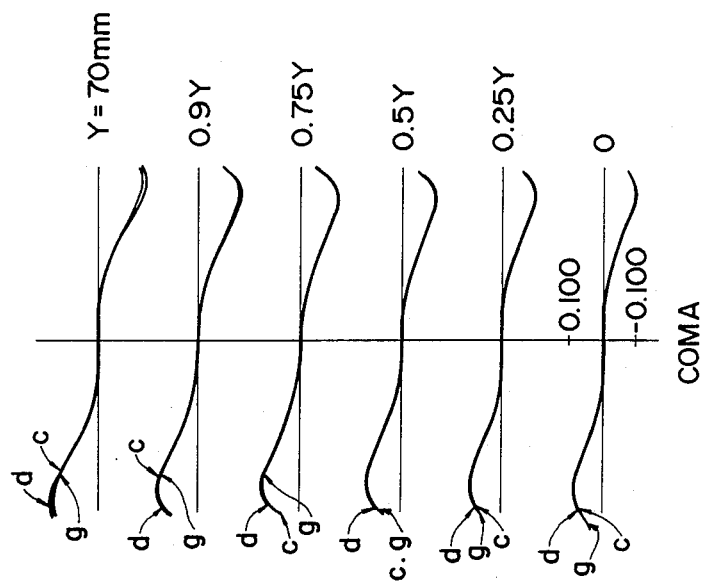
FIGS. 10a through 10d are graphs showing the aberration characteristics of a further embodiment of the present lens system.
Figures 10B, 10C:
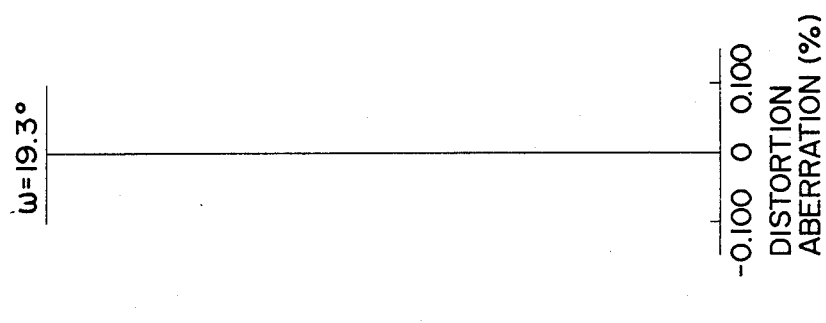
Figure 10A:
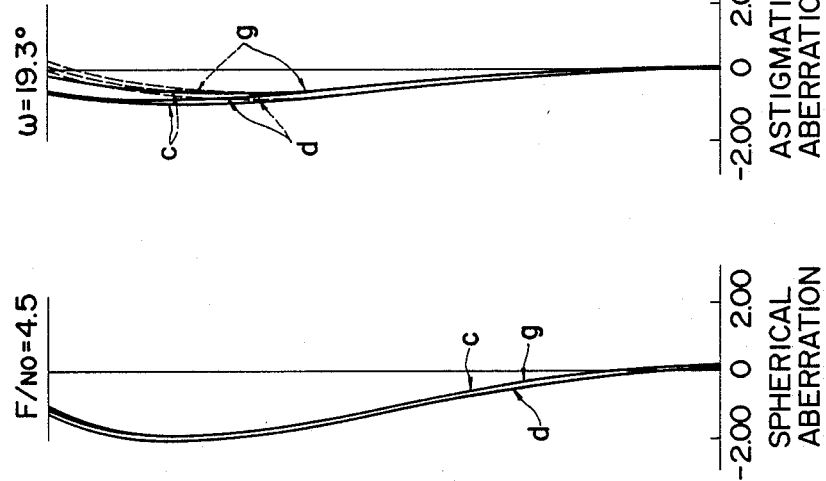

For this example 2, the aberration characteristics are shown in FIGS. 6a through 6d and the MTF characteristics for R, G and B are shown in FIGS. 7 through 9, respectively.

EXAMPLE 3

$f=99.989$ $f_{1.2}=-588.491$ $f_{3.4}=103.500$
F/No.$=4.5$ $\omega=19.3°$ Y$=70$ mm m$=1.0$
$r_1=31.831$ $d_1=6.973$ $n_1=1.74330$ $\nu_1=49.2$
$r_2=-164.168$ $d_2=0.047$
$r_3=-158.572$ $d_3=4.571$ $n_2=1.61340$ $\nu_2=44.3$
$r_4=20.024$ $d_4=1.236$
$r_5=23.571$ $d_5=1.399$ $n_3=1.51009$ $\nu_3=63.4$
$r_6=17.825$ $d_6=2.915$ $n_4=1.49700$ $\nu_4=81.6$
$r_7=41.459$ $d_7=0.979$
$r_8=\infty$(stop) $d_8=0.979$
$r_9=-41.459$ $d_9=2.915$ $n_5=1.49700$ $\nu_5=81.6$
$r_{10}=-17.825$ $d_{10}=1.399$ $n_6=1.51009$ $\nu_6=63.4$
$r_{11}=-23.571$ $d_{11}=1.236$
$r_{12}=-20.024$ $d_{12}=4.571$ $n_7=1.61340$ $\nu_7=44.3$
$r_{13}-158.572$ $d_{13}=0.047$
$r_{14}=164.168$ $d_{14}=6.973$ $n_8=1.74330$ $\nu_8=49.2$
$r_{15}=-31.831$ $$|f_{3.4}/f_{1.2}| = 0.18 \quad (1)$$

$$\nu_4 - \nu_3 = 18.2 \quad (2)$$

$$n_1 = 1.74330 \quad (3)$$

Figure 11:
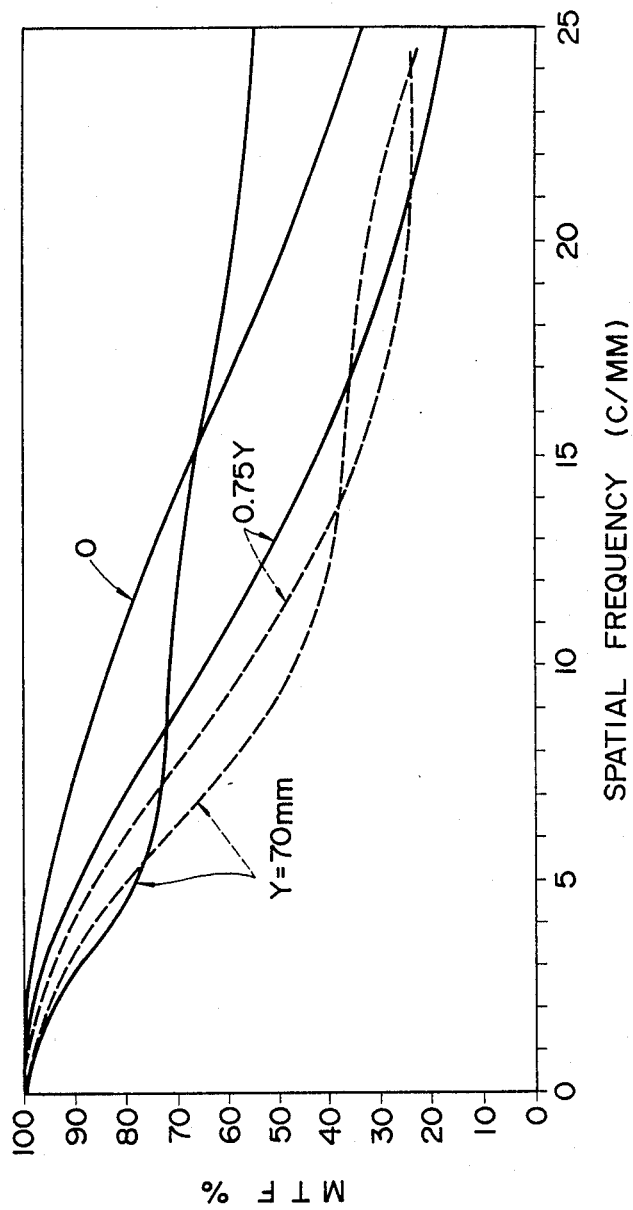
FIGS. 11 through 13 are graphs showing MTF curves for R, G and B, respectively, for the embodiment shown in FIGS. 10a through 10d.
Figure 12:
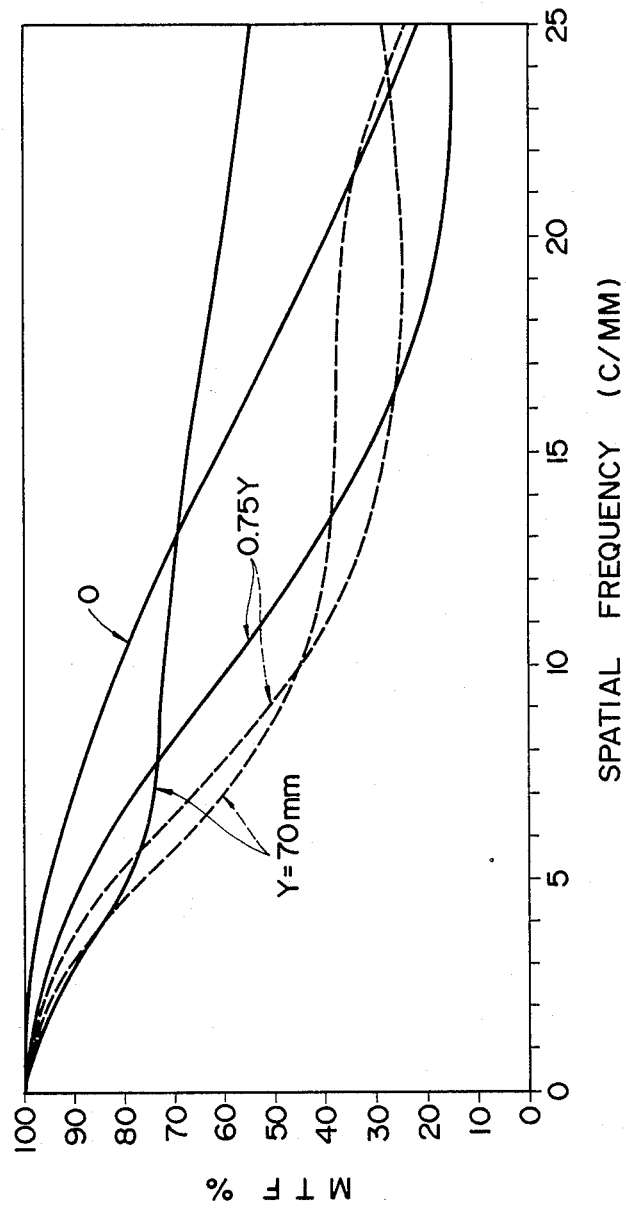
Figure 13:
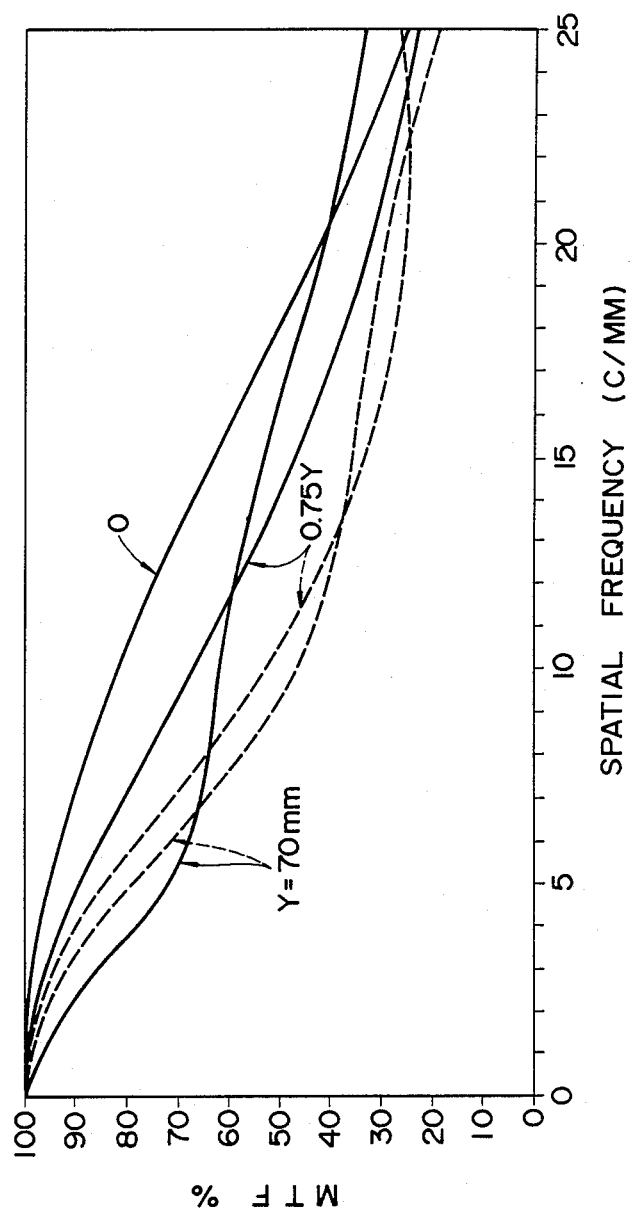

For this example 3, the aberration characteristics are shown in FIGS. 10a through 10d and the MTF characteristics for R, G and B are shown in FIGS. 11 through 13, respectively.

As apparent from each of the above-described examples, a lens system for a copier in accordance with the principle of the present invention has a minimized longitudinal color aberration, which can be a big problem particularly for a full color copier, over a wide range from g line to c line. In addition, the present lens system has the F number of 4.5 which is light. Further, although the vignetting factor is 100%, the curvature of an image plane is small as may be easily understood when reference is made to the graphs illustrating the aberration characteristics. Moreover, the longitudinal and lateral characteristics are well balanced. And, the coma flare is extremely small. As apparent from the MTF characteristic curves, when the present lens system is used in a full color copier, all of the R, G and B color component images are obtained on the same image plane without errors in magnification and high in contrast. As a result, the problems, such as color discrepancy and color blurring, do not appear. The quality of the resulting image is extremely high. In addition, a full color reproduction operation can be implemented with a simple structure comparable to that of a monochromatic copier. It is to be noted that color separation can be carried out with any desired distribution of weight other than those shown in FIG. 14, and the present lens system can also be used for monochromatic copiers, printers, facsimile machines, or the like.

While the above provides a full and complete disclosure of the preferred embodiments of the present invention, various modifications, alternate constructions and equivalents may be employed without departing from the true spirit and scope of the invention. Therefore, the above description and illustration should not be construed as limiting the scope of the invention, which is defined by the appended claims.

What is claimed is:

1. A lens system having a six unit and eight element structure, comprising, in the order mentione from an object side;
    a first unit including a first lens which is a double-convex lens;
    a second unit including a second lens which is a double-concave lens;
    a third unit including a third lens which is a concave meniscus lens arranged with its convex surface directed to the object side and a fourth lens which is a convex meniscus lens cemented to said third lens and arranged with its convex surface directed to the object side;
    a stop;
    a fourth unit including a fifth lens which is a convex meniscus lens identical to said fourth lens and arranged with its concave surface directed to the object side of a sixth lens which is a concave meniscus lens identical to said third lens and cemented to said fifth lens with its concave surface directed to the object side;
    a fifth unit including a seventh lens which is a double-concave lens identical to said second lens; and
    a sixth unit including an eighth lens which is a double-convex lens identical to said first lens;
    whereby the conditions of $$0.05 < |f_{3.4}/f_{1.2}| < 0.27;$$

$$10 < \nu_4 - \nu_3 < 30; \text{ and}$$

$$n_1 > 1.67;$$

are satisfied;
    where, $f_{1.2}$: combined focal distance for the first (sixth) and second (fifth) units;
    $f_{3.4}$: combined focal distance for the third (fourth) unit;
    $\nu_3$: Abbe number of the third (sixth) lens;
    $\nu_4$: Abbe number of the fourth (fifth) lens; and
    $n_1$: Refractive index of the first (eight) lens.

2. The lens system of claim 1 wherein said lens system has a completely symmetrical structure with said stop as a center of symmetry.

3. A lens system for use in a full color copier having a six unit and eight element structure, comprising, in the order mentioned from an object side:
    a first unit including a first lens which is a double-convex lens;
    a second unit including a second lens which is a double-concave lens;
    a third unit including a third lens which is a concave meniscus lens arranged with its convex surface directed to the object side and a fourth lens which is a convex meniscus lens cemented to said third lens and arranged with its convex surface directed to the object side;
    a stop;
    a fourth unit including a fifth lens which is a convex meniscus lens identical to said fourth lens and arranged with its concave surface directed to the object side of a sixth lens which is a concave meniscus lens identical to said third lens and cemented to said fifth lens with its concave surface directed to the object side;
    a fifth unit including a seventh lens which is a double-concave lens identical to said second lens; and
    a sixth unit including an eighth lens which is a double-convex lens identical to said first lens;
    whereby the conditions of $$0.05 < |f_{3.4}/f_{1.2}| < 0.27;$$

$$10 < \nu_4 - \nu_3 < 30; \text{ and}$$

$$n_1 > 1.67;$$

are satisfied;
    where, $f_{1.2}$: combined focal distance for the first (sixth) and second (fifth) units;
    $f_{3.4}$: combined focal distance for the third (fourth) unit;
    $\nu_3$: Abbe number of the third (sixth) lens;
    $\nu_4$: Abbe number of the fourth (fifth) lens; and
    $n_1$: Refractive index of the first (eighth) lens.

* * * * *